(12) United States Patent
Conolly et al.

(10) Patent No.: US 8,993,089 B2
(45) Date of Patent: Mar. 31, 2015

(54) CLOSED CELL MATERIALS

(71) Applicants: Brian John Conolly, Northwood (AU); Thomas Kenneth Hussey, Balmain (AU)

(72) Inventors: Brian John Conolly, Northwood (AU); Thomas Kenneth Hussey, Balmain (AU)

(73) Assignee: Zhik Pty Ltd (AU)

( * ) Notice: Subject to any disclaimer, the term of this patent is extended or adjusted under 35 U.S.C. 154(b) by 0 days.

(21) Appl. No.: 13/767,615

(22) Filed: Feb. 14, 2013

(65) Prior Publication Data
US 2013/0216774 A1 Aug. 22, 2013

(30) Foreign Application Priority Data
Feb. 16, 2012 (AU) .................................. 2012900558

(51) Int. Cl.
*B32B 15/04* (2006.01)
*B32B 5/24* (2006.01)
(Continued)

(52) U.S. Cl.
CPC ................ *B32B 15/046* (2013.01); *B32B 3/26* (2013.01); *B32B 5/026* (2013.01); *B32B 5/022* (2013.01); *B32B 5/024* (2013.01); *B32B 3/266* (2013.01); *B32B 3/263* (2013.01); *B32B 38/10* (2013.01); *B32B 5/245* (2013.01); *B32B 33/00* (2013.01); *B32B 27/065* (2013.01); *B32B 27/12* (2013.01); *B32B 27/285* (2013.01); *B32B 38/06* (2013.01); *B32B 38/0008* (2013.01); *B32B 2037/246* (2013.01); *B32B 2038/0092* (2013.01); *B32B 2305/022* (2013.01); *B32B 2305/18* (2013.01); *B32B 2307/724* (2013.01);
(Continued)

(58) Field of Classification Search
CPC ........... A41D 31/0088; A41D 31/0094; A41D 31/0027; A41D 31/0038; B32B 5/245; B32B 15/046
USPC .................. 442/315, 221, 371, 222; 428/141, 428/314.4, 138
See application file for complete search history.

(56) References Cited

U.S. PATENT DOCUMENTS 4,136,222 A * 1/1979 Jonnes ......................... 428/116
4,583,247 A * 4/1986 Fingerhut et al. ................... 2/69
(Continued)

FOREIGN PATENT DOCUMENTS

CN 102326904 A 1/2012
EP 0122716 A1 10/1984
(Continued)

OTHER PUBLICATIONS

Thermal Conductivity of Metals, http://www.engineeringtoolbox.com/thermal-conductivity-metals-d_858.html, May 8, 2006.*
(Continued)

*Primary Examiner* — Aaron Austin
*Assistant Examiner* — Jasper Saberi
(74) *Attorney, Agent, or Firm* — St. Onge Steward Johnston & Reens LLC

(57) ABSTRACT

Fabrics made for watersports and outerwear apparel, tents, sleeping bags and the like, in various composites, constructed such that there is at least one metal layer, forming a radiant barrier to reduce heat loss via radiation, and insulating this metal layer from conductive heat loss, and a process for its manufacture.

42 Claims, 5 Drawing Sheets

(51) Int. Cl.
*A41D 31/00* (2006.01)
*B32B 3/26* (2006.01)
*B32B 5/02* (2006.01)
*B32B 38/10* (2006.01)
*B32B 33/00* (2006.01)
*B32B 27/06* (2006.01)
*B32B 27/12* (2006.01)
*B32B 27/28* (2006.01)
*B32B 38/06* (2006.01)
*B32B 38/00* (2006.01)
*B32B 37/24* (2006.01)

(52) U.S. Cl.
CPC .... *B32B 2307/7265* (2013.01); *B32B 2437/00* (2013.01); *B32B 2255/10* (2013.01); *B32B 2255/205* (2013.01); *B32B 2255/28* (2013.01); *B32B 2266/0207* (2013.01); *B32B 2307/304* (2013.01); *B32B 2307/3065* (2013.01); *B32B 2307/416* (2013.01); *B32B 2307/7145* (2013.01); *B32B 2307/73* (2013.01); *B32B 2307/306* (2013.01); *A41D 31/0038* (2013.01)
USPC .......... 428/135; 442/371; 442/222; 442/315; 428/314.4; 428/138

(56) References Cited

U.S. PATENT DOCUMENTS

| | | | |
|---|---|---|---|
| 4,739,012 A | 4/1988 | Hagman | |
| 4,868,062 A | 9/1989 | Hoeschele et al. | |
| 5,874,164 A * | 2/1999 | Caldwell | 428/306.6 |
| 5,924,134 A * | 7/1999 | Taylor et al. | 2/81 |
| 5,955,175 A | 9/1999 | Culler | |
| 6,083,628 A | 7/2000 | Yializis | |
| 6,800,573 B2 | 10/2004 | Van De Ven et al. | |
| 2004/0213918 A1* | 10/2004 | Mikhael et al. | 427/446 |
| 2006/0040091 A1 | 2/2006 | Bletsos et al. | |
| 2006/0292345 A1* | 12/2006 | Dave et al. | 428/141 |
| 2007/0166528 A1* | 7/2007 | Barnes et al. | 428/304.4 |
| 2009/0005238 A1* | 1/2009 | Falaras | 502/200 |
| 2010/0247855 A1* | 9/2010 | Bletsos et al. | 428/137 |
| 2011/0173734 A1* | 7/2011 | Mikhail et al. | 2/69 |
| 2011/0262699 A1* | 10/2011 | Yializis et al. | 428/138 |

FOREIGN PATENT DOCUMENTS

| | | |
|---|---|---|
| FR | 2581158 A1 | 10/1986 |
| WO | 8302750 A1 | 8/1983 |
| WO | 9818852 A1 | 5/1998 |
| WO | 2011063472 A1 | 6/2011 |
| WO | 2012073095 A1 | 6/2012 |

OTHER PUBLICATIONS

Thermal Conductivity of some Materials and Gases, http://www.engineeringtoolbox.com/thermal-conductivity-d_429.html, Feb. 16, 2006.*

Merriam-Webster Online Dictionary, Through_Merriam-Webster Dictionary, http://www.merriam-webster.com/dictionary/through, Oct. 15, 2014.*

Search Report Application No. GB1302756.0 May 22, 2013 2 pages.

* cited by examiner

CLOSED CELL MATERIALS

FIELD OF THE INVENTION

The present invention relates to fabrics made for watersports and outerwear apparel, tents, sleeping bags and the like, in various composites, constructed such that there is at least one metal layer, forming a radiant barrier to reduce heat loss via radiation, and insulating this metal layer from conductive heat loss, and a process for its manufacture.

BACKGROUND OF THE INVENTION

This present invention is an improved closed cell composite fabric, providing more thermal resistance and reduced heat loss than other closed cell composites of comparable width, while also being lighter and optionally breathable. This present invention shows how closed cell foam, in either perforated or non-perforated form, can be combined with one or two substrates, with at least one of these substrates metallized to also act as a radiant barrier. The composite has laminated outer textile layers appropriate to the application, such as Nylon for outer layers or fleece for inner layers, together with any additional functionalization, such as hydrophobic or antibacterial coating.

In the present invention the use of metallization to create infrared reflecting barriers is adopted for watersports apparel, clothing or outdoor equipment such as sleeping bags or tents. Corrosion, particularly in salty environments, of these metal layers through oxidisation can be considerable and methods known in the art are adopted to help prevent oxidisation. These radiant barriers, however, also require careful insulation from heat loss via conduction, and moisture management to help keep emissivity low.

When a moisture vapor permeable substrate is coated over substantially an entire surface using conventional methods such as air knife coating, flexographic printing, gravure coating, etc., the coating reduces the moisture vapor permeability of the substrate. If the starting substrate has an open structure and is highly air permeable, the substrate can retain sufficient moisture vapor permeability after coating to be useful in certain end uses, such as apparel. For example, fabrics described in U.S. Pat. No. 5,955,175 to Culler are both air permeable and moisture vapor permeable after being metallized and coated with an oleophobic coating.

When the starting moisture vapor permeable substrate is a non-porous monolithic membrane, conventional coatings result in significant covering of the surface of the substrate. This results in a coated substrate having significantly lower moisture vapor permeability than the starting substrate. This is undesirable in apparel or outdoor equipment products, which are desirably permeable to moisture vapor while at the same time forming a barrier to infiltration by air and water. As described by Sympatex in U.S. Pat. No. 6,800,573 it is possible to coat these non-porous vapour permeable substrates using a plasma cleaned vapour deposition metalization process and maintain good vapour permeability.

US Patent Application Publication US 2004/0213918 A1 (Mikhael et al.) discloses a process for functionalizing a porous substrate, such as a nonwoven fabric or paper, with a layer of polymer, and optionally a layer of metal or ceramic. According to one embodiment, the process includes the steps of flash evaporating a monomer having a desired functionality in a vacuum chamber to produce a vapor, condensing the vapor on the porous substrate to produce a film of the monomer on the porous substrate, curing the film to produce a functionalized polymeric layer on the porous substrate, vacuum depositing an inorganic layer over the polymer layer, and flash evaporating and condensing a second film of monomer on the inorganic layer and curing the second film to produce a second polymeric layer on the inorganic layer. Mikhael et al. also discloses another embodiment including the steps of flash evaporating and condensing a first film of monomer on the porous substrate to produce a first film of the monomer on the porous substrate, curing the film to produce a functionalized polymeric layer on the porous substrate, vacuum depositing a metal layer over the polymer layer, and flash evaporating and condensing a second film of monomer on the metal layer and curing the second film to produce a second polymeric layer on the metal layer.

US Patent Applications US 2007/0166528 A1 (Barnes et al.) discloses a process for oxidising the surface of a metal coating with an oxygen-containing plasma to form a synthetic metal oxide coating, making a superior resistance to corrosion of the metallized porous sheet. These sheets, however, are micro-porous and less durable than can be constructed by non-porous monolithic membranes.

It would be desirable to provide metallized fabrics that have good protection against oxidation while not sacrificing high moisture vapor permeability for uses requiring good thermal barrier properties such as clothing, sleeping bags and tents.

Methods for both improving the moisture vapour permeability of the composite and insulating the metal layer from conduction are disclosed in PCT application No. PCT/IB2011/002872 (Conolly et al). Conolly achieved this by covering the substrate first with a textile prior to metallization, where this textile is then preferably a very open pore structure, such that the metallization coats through the air gaps of the textile onto the substrate layer. Methods for managing the infra red emissivity of the metal layer are also disclosed by Conolly, achieved by protecting the metal layer from moisture, where the textile is preferably high wicking/hydrophilic and the metal layer is coated for water and/or oil repellent functionality.

U.S. Pat. No. 4,136,222 (Jonnes) describes a thermally insulating sheet material where a specularly reflective sheet material, between 2.5 mm and 10.5 mm, is supported in spaced relation from a thermally radiating surface by an array of resiliently flexible and compressible polymeric foam segments that cover only a portion of the area of the sheet. Jonnes explains that none of the prior art is acceptable for commercial insulation for garments, as the structures are all too rigid and his invention avoids such deficiencies by use of a novel separator layer.

U.S. Pat. No. 4,583,247 (Fingerhut), describes an improvement to Jonnes, utilizing a substantially continuous, yet porous, interlining sheet material with the reflective sheet material facing outwards, adhered at spaced intervals, and preferably protected from oxidisation with an outer layer of transparent material comprising a clear plastic film.

In both U.S. Pat. Nos. 4,136,222 and 4,583,247 the spacer fabric is fundamentally porous, and the protection from oxidisation proposed by U.S. Pat. No. 4,583,247 adds too much bulk to the composite.

In the current invention, a closed cell foam, such as neoprene foam, is used as the insulating layer for the metal layer radiant barrier. The metal layer has low emissivity and can be facing towards the closed cell foam. It has been shown that even with unperforated closed cell foam that this structure measures to a higher thermal resistance with a metal layer radiant barrier. It has also been shown that when the closed cell foam is highly perforated that the metal layer is a more effective radiant barrier in the composite.

In the current invention, through the use of a closed cell spacer structure, there is resilience to the total fabric from filling with water if there is an accidental puncture of the fabric through use.

Methods for both improving the moisture vapour permeability of the composite and insulating the metal layer from conduction are disclosed in the present invention. This can be achieved by covering the substrate first with a textile prior to metallization, where this textile is then preferably a very open pore structure, such that the metallization coats through the air gaps of the textile onto the substrate layer. Methods for managing the infra red emissivity of the metal layer are also disclosed, achieved by protecting the metal layer from moisture, where the textile is preferably high wicking/hydrophilic and the metal layer is coated for water and/or oil repellent functionality.

SUMMARY OF THE INVENTION

This present invention is an improved closed cell composite fabric, providing more thermal resistance and reduced heat loss than other composites of comparable thicknesses, while also being lighter and optionally breathable. Fundamentally this present invention is a closed cell foam, laminated to either one substrate, or sandwiched between two substrates, with at least one metal layer to act as a radiant barrier. The substrates are preferably substantially liquid impermeable and optionally moisture vapour permeable to provide breathability, and are laminated to outer textile layers appropriate to the application, such as Nylon for outer layers or fleece for inner layers, together with any additional functionalization, such as hydrophobic or antibacterial coating. The total composite fabric is preferably waterproof, and optionally moisture vapour permeable to make it breathable.

This improved closed cell composite fabric is used for watersports apparel, outerwear and equipment, where lighter weight fabric is desired for comparable warmth, and applications where higher moisture vapour transfer is desired.

In the present invention, the closed cell foam layer can be optionally perforated or embossed in a pattern, such that air gaps expose the radiant barrier of the internal metal layer adjacent to the foam layer, and a mechanical physical separation is created to help reduce the likelihood of the metal layer touching other external surfaces and causing heat conduction.

In one embodiment, the closed cell foam is perforated after it is cut into a desired thickness. In an alternative embodiment, the perforations are formed by a molded pattern during the creation of the foam and then cut to a desired thickness.

In one embodiment, the substrate or substrates are pre-laminated to an outer textile layer(s) prior to lamination to the closed cell foam. In addition at least one of these substrates is metalized first. The preferred manufacturing technique for metalization of the substrate is via plasma treated, vacuum vapour deposition, including flash evaporation of the metallic, organic and inorganic components.

In addition the metal layer can have increased corrosion resistance by oxidising the surface of a metal coating with an oxygen-containing plasma to form a self protective metal oxide coating.

Functionalization of the outer substrates can also be optionally included, and alternative embodiments of the present invention may also have extra material layers in the composite. Any layer may be coated for functionalization, to be flame retardant, UV absorbing, self cleaning, hydrophobic, hydrophilic, antibacterial or other function.

DETAILED DESCRIPTION OF THE INVENTION

As used herein, the term "metal" includes metal alloys as well as metals.

Figure 1A:
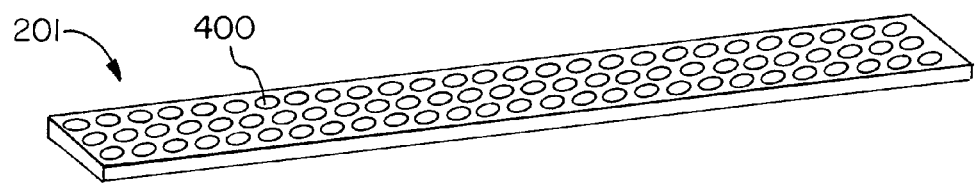
FIGS. 1a-g show schematics of the various layers that make up the total composite, including; 1a a closed cell layer, 1b and 1f an outer composite, 1c, 1e and 1g an inner composite and 1d a total composite.
Figure 1B:
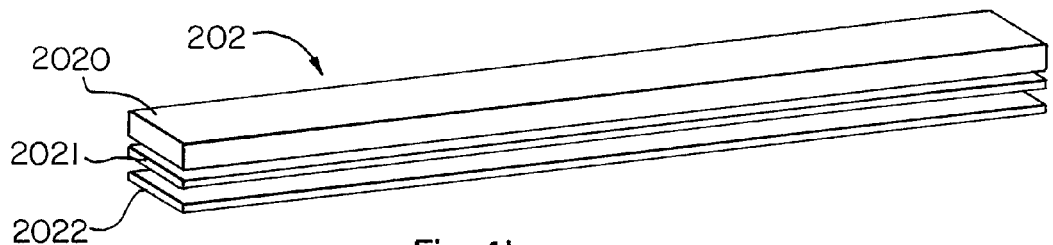
Figure 1C:
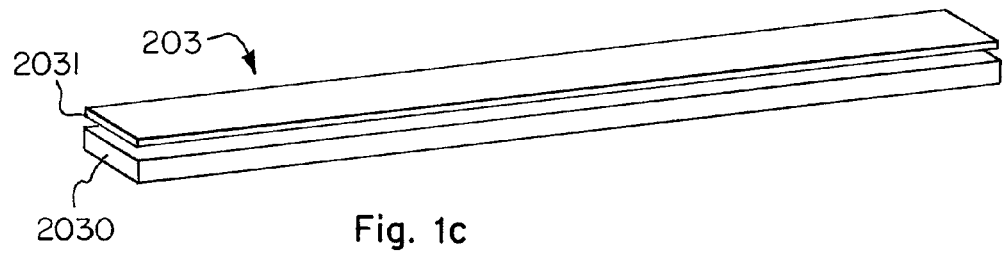
Figure 1D:
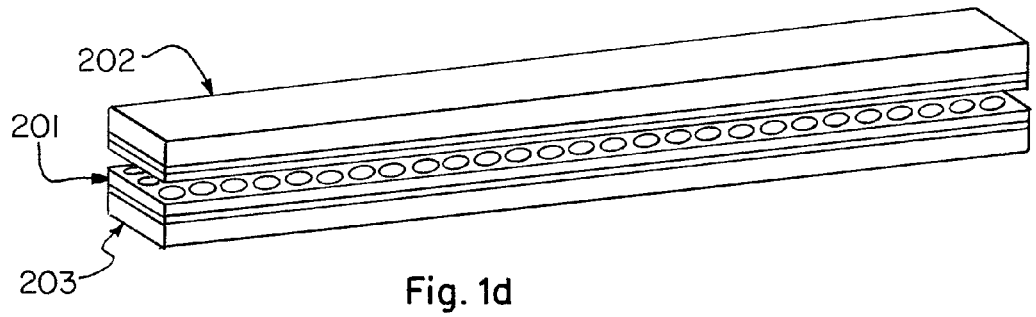
Figure 1E:
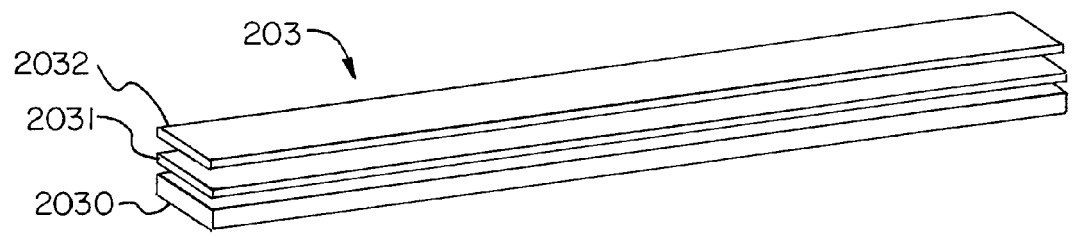

In one embodiment shown in FIG. 1, outer layer composite 202 is made up of a first substrate layer 2021 and optional second substrate layer 2020 and metal layer 2022 as shown in FIG. 1b. Inner layer composite 203 is made up of a first substrate layer 2031 and optional second substrate 2030 as shown in FIG. 1c. Said inner layer may also optionally feature a metal layer 2032 as shown in FIG. 1e. The closed cell foam 201 is sandwiched between outer layer composite 202 and inner layer composite 203 as shown in FIG. 1d. The closed cell foam 201 is optionally perforated or embossed.

Figure 1F:
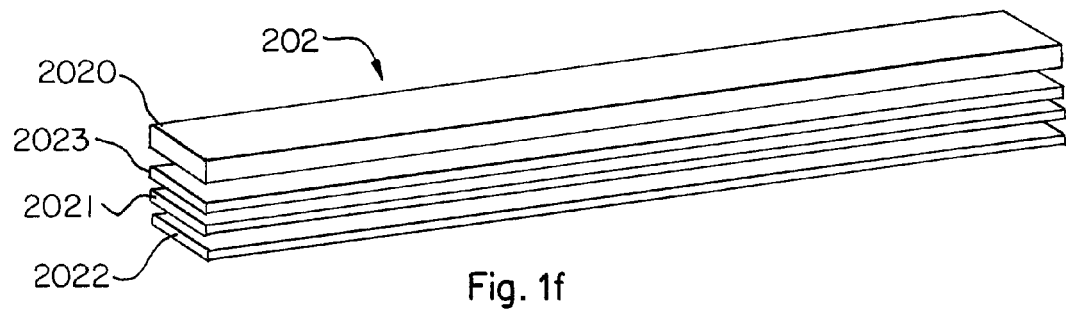
Figure 1G:
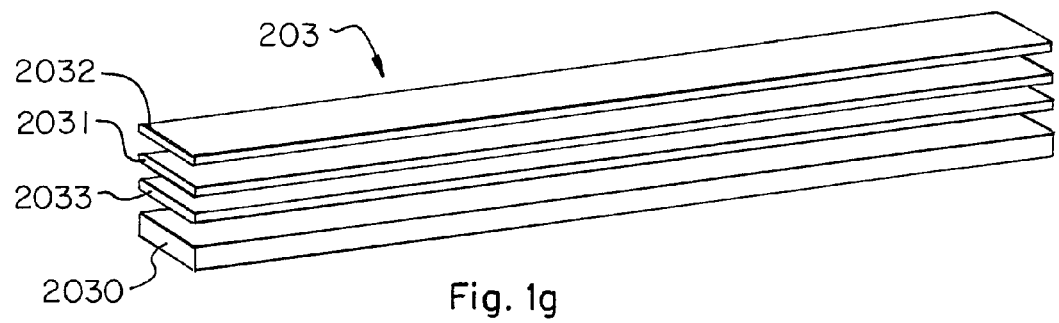

In another embodiment of the present invention, outer layer 202 features one or more additional substrate layers 2023 as shown in FIG. 1f. In another alternative embodiment, inner layer 203 features one or more additional substrate layers 2033 as shown in FIG. 1g.

In an alternative embodiment outer layer 202 is laminated to the closed cell foam 201, and the composite is open on the inner side with the closed cell foam 201 exposed.

In one embodiment, the substrates 2021 and 2031 are preferably substantially liquid impermeable and optionally moisture vapour permeable, and can be a microporous type, such as PTFE, or a monolithic vapour permeable type, for example, that is preferably a thin film not more than 100 µm, or preferably not more than 50 µm, or preferably not more than 25 µm. In another embodiment said substrates 2021 and 2031 can also optionally be a thin foam, such as a closed cell foam neoprene, preferably thin and not more than 1 mm, or preferably not more than 0.5 mm in thickness. Said substrates preferably have high stretch, preferably greater than 150%, or preferably greater than 200%, or even as high as 350%.

Substrates 2020 and 2030 are a knitted, woven or non woven textile, preferably with high stretch. Said textile may comprise nylon, polyester, spandex, polypropylene or other material or mix thereof. In one preferred embodiment at least one of the said textile substrates are in the form of a thick brushed fleece.

In one embodiment, the present invention relates to an infra-red reflective, moisture vapor permeable composite formed by sandwiching a perforated closed cell foam 201, between an outer layer composite 202 and inner layer composite 203, where both the outer and inner layer composites are also pre-laminated with water vapour permeable membranes, where at least one of these membranes is metalized.

In a preferred embodiment of the invention, the said outer textile substrate 2020 is bonded to a non-porous, moisture vapor permeable and substantially liquid impermeable monolithic film 2021. This substrate 2021 is metalized prior to lamination to the outer textile substrate 2020 to form said metal layer 2022. In an alternative embodiment, said substrate layer 2021, is a microporous, moisture vapor permeable membrane.

In a preferred embodiment of the invention, the said inner textile substrate 2030 is bonded to a non-porous, moisture vapor permeable and substantially liquid impermeable monolithic film 2031. This substrate 2031 is optionally metalized prior to lamination to the outer textile substrate 2030 to form a metal layer 2032. In an alternative embodiment, said substrate layer 2021, is a microporous, moisture vapor permeable membrane.

In a further preferred embodiment, the closed cell foam 201 is perforated in a pattern with an open structure such that a high percentage of the metal layer 2022 is still exposed through the said perforations, thus maintaining good infrared reflectance of the metal surface and overall low emissivity of the metal layer. The metal layer 2022 itself can have an organic or inorganic coating with hydrophobic functionalization to protect it from moisture and oxidisation. Preferably, a thin organic or inorganic coating is also deposited on the surface of the metal layer 2022 to further protect the metal layer from moisture and oxidisation. The substrate of outer layer composite 2020 or inner layer composite 2030 can also optionally have an outer organic or inorganic coating, to provide other functionalization useful in the application, such as oleophobic, hydrophobic, UV absorbing, antibacterial polymerisation and the like.

Figure 2A:
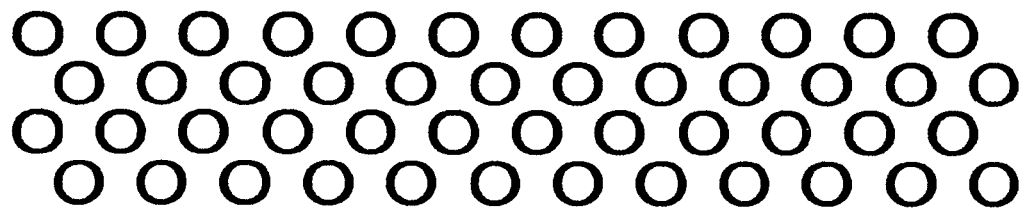
FIGS. 2a, 2b, 2c, 2d and 2e show example patterns that can be adopted for the insulating closed cell layer.
Figure 2B:
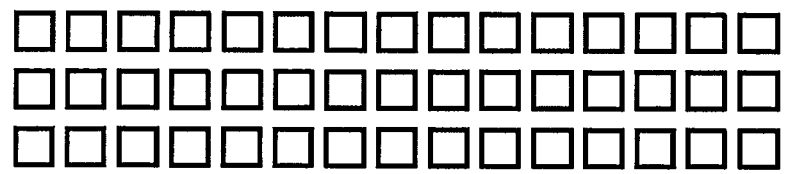
Figure 2C:
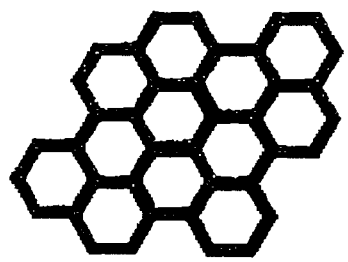
Figure 2D:
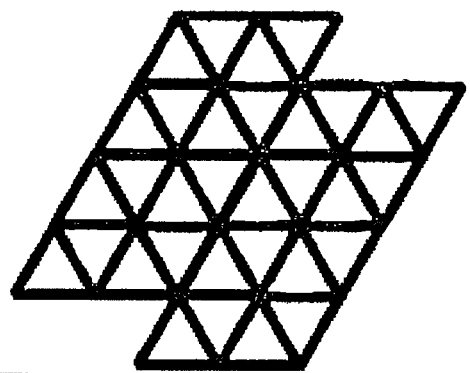
Figure 2E:
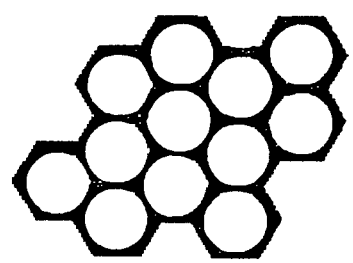
Figure 3A:
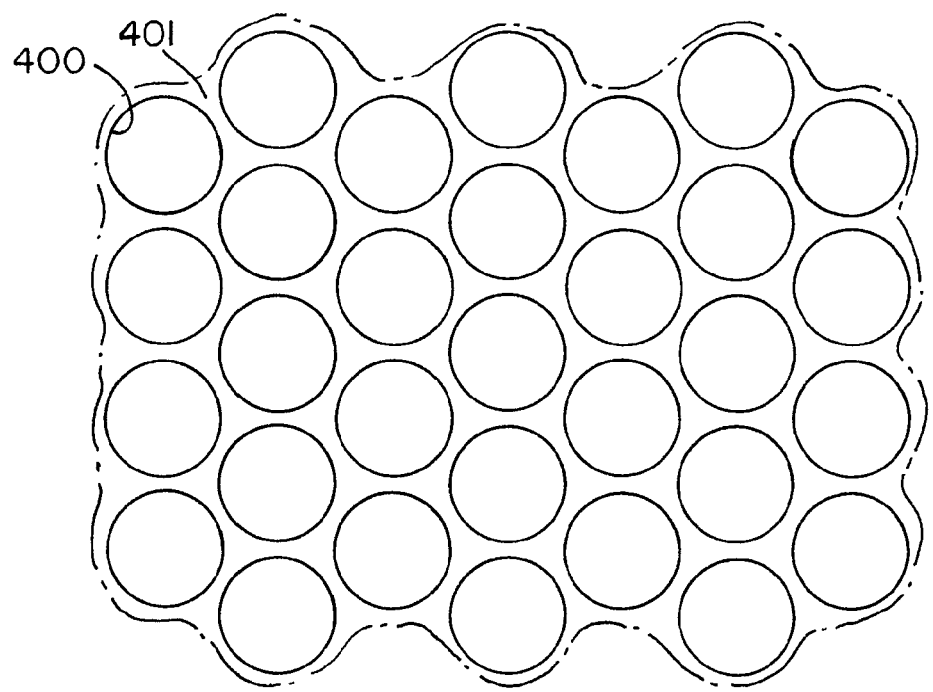
FIGS. 3a and 3b show two versions of a similar pattern with different perforation density.
Figure 3B:
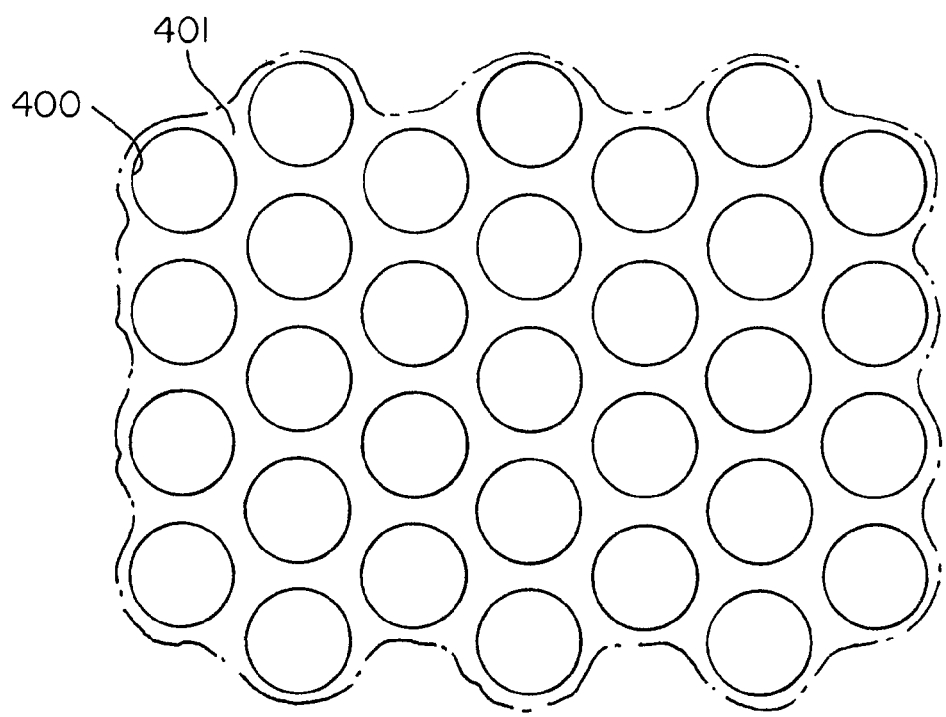

In one embodiment of the present invention, the perforated closed cell pattern is chosen to promote air gaps to expose a good proportion of the metal layer for infrared reflection while still maintaining mechanical stability. Results and tests have shown perforations that expose less than 25% of the surface area of the reflective layer have little to no improvement to unperforated closed cell foam. Meanwhile, other results show, where there is more than 40% of the surface area of the metal surface exposed, significantly better thermal resistance properties exist and the radiant barrier of the metal layer makes a significant improvement. Although many different styles of perforations can be adopted, such as shown in FIGS. 2a, 2b, 2c, 2d. FIG. 2e is a good choice for both mechanical and structural stability while also providing a good percentage of exposed reflective area. Two examples of the pattern 2e is shown In FIGS. 3a and 3b. FIG. 3a has a larger diameter perforation than in FIG. 3b, and has 73.6% air, whereas FIG. 3b has 58.1%. FIG. 3a, however, also has thinner walls between the perforations that may be more prone to breaking when stretched. For each application it is important to choose the optimum perforation to balance strength with maximising air percentage.

Figure 4A:
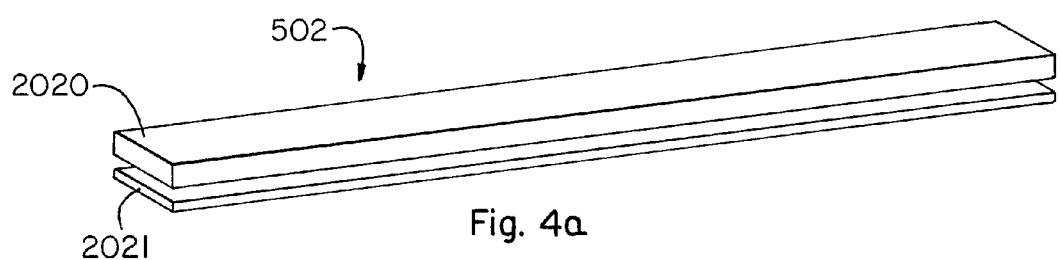
FIGS. 4a-c show schematics of the various layers that make up the total composite, including; 4a an outer layer composite, 4b an inner layer composite with radiant barrier and 4c a total composite.
Figure 4B:
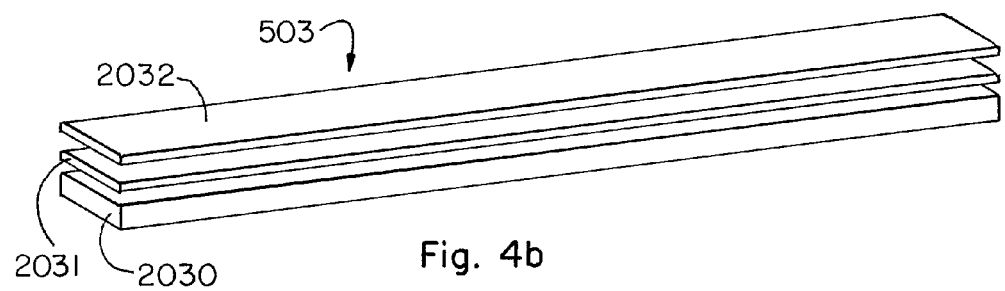
Figure 4C:
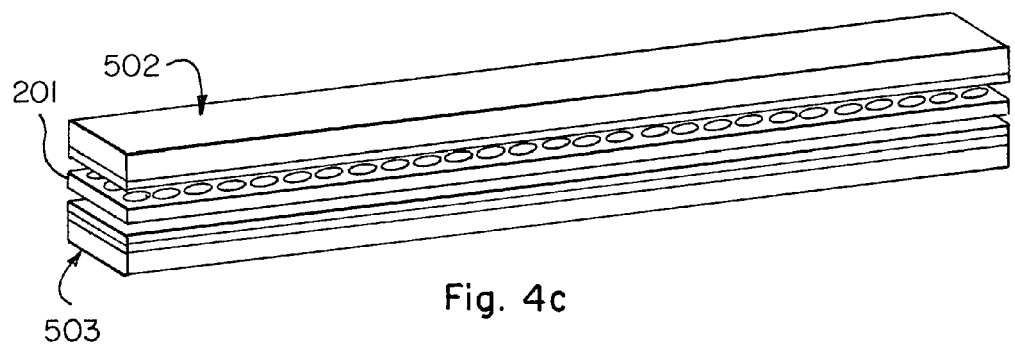

Another preferred embodiment of the present invention is shown in FIGS. 4 a-c, outer layer composite 502 is made up of a first substrate 2021 and optional second substrate 2020 as shown in FIG. 4a. Inner layer composite 503 is made up of a first substrate 2031 and optional second substrate 2030 and metal layer 2032 as shown in FIG. 4b. The cell foam 201 is sandwiched between outer layer composite 502 and inner layer composite 503 as shown in FIG. 4c. Closed cell foam 201 is optionally perforated or embossed, and the outer substrate 2021 is optionally a thin neoprene of less than 1 mm thickness, or preferably less than 0.7 mm thickness. In this embodiment the composite is not designed to be highly breathable, however the outer surface can be water repellent, the inner surface with good heat retention warmth towards the body, and the internal structure with higher thermal resistance and lighter weight to an equivalent thickness of regular neoprene. Overall this embodiment is an improved wetsuit material, and has one thin film in the embodiment, rather than two, in order to maintain lower cost and potentially higher stretch.

In another embodiment per FIGS. 4a-c, the outer composite 502 is deleted, a closed cell foam 201 is not perforated, but is optionally embossed such that the air pockets created by the embossing faces the inner composite 503.

In all such embodiments, layer components are chosen in order to maintain stretch and drape as appropriate for the application. For good overall stretch and drape to be maintained, all layer components need to be high stretch.

| Sample | % Perforations | Thermal Resistance | |
|---|---|---|---|
| | | Membrane | Metallized Membrane |
| A | 0% | 0.1591 | 0.1766 |
| B | 6% | 0.1581 | 0.1704 |
| C | 25% | 0.1579 | 0.1766 |
| D | 51% | 0.1573 | 0.2003 |

The table above shows thermal resistance values for different composite samples. Each sample A, B, C, D are neoprene that is perforated with % surface area as shown. Sample A has no perforations, whereas sample D is highly perforated to cover 51% of the surface area. With these neoprene samples A, B, C, D then covered with a membrane material, it is shown that increased perforations lowers the thermal resistance, contrary to belief that the air pockets would be advantageous. If the membrane is also coated with a metallic layer, in this case with an emissivity of 0.15, it is shown that all samples of neoprene show an advantage as compared to no metallization. Results show that there is an increase in thermal resistance with the addition of the metallized membrane radiant barrier, even with no perforations in the neoprene at all, contrary to expectations. If, however, one compares the results from samples with various percentage of surface area perforated, then combined with a metallized membrane, the results show that sample B, with only 6% of the surface area perforated, has a thermal resistance less than sample A with no perforations. A metallized membrane combined with a neoprene with higher perforations, as in sample D, however, shows considerable improvement to sample A. It can be shown that for all neoprenes the addition of a radiant barrier will improve the thermal resistance, and that the addition of perforations needs to be above certain surface area values depending on the emissivity of the radiant barrier, and that when the emissivity of the radiant barrier is good, at 0.15 or lower, utilizing a highly perforated neoprene provides significant advantage to thermal resistance.

In a further embodiment of the present invention, organic or inorganic coatings are applied to said component layers 2020, 2021, 2030, 2031, as appropriate to apply functionality such as hydrophobic, antibacterial, hydrophilic, or metalization. These said coatings, including metallization such as 2022 or 2032, are preferably applied after first plasma treating the substrate, then vapour deposition in a vacuum.

Said organic or in-organic coatings comprise one or more functional components. Functionalities include hydrophilic coatings from monomers functonalised with groups including hydroxyl, carboxyl, sulphonic, amino, amido and ether. Hydrophobic coatings from monomers with hydrofluoric functional groups and/or monomers that create nanostructure on the textile surface. Antimicrobial coatings from a monomer with antimicrobial functional groups and/or encapsulated antimicrobial agents (including chlorinated aromatic compounds and naturally occurring antimicrobials). Fire retardant coatings from monomers with a brominated functional group. Self cleaning coatings from monomers and/or sol gels that have photo-catalytically active chemicals present (including zinc oxide, titanium dioxide, tungsten dioxide and other metal oxides). Ultraviolet protective coating from monomers and/or sol-gels that contain UV absorbing agents (including highly conjugated organic compounds and metal oxide compounds).

Said substrates can be moisture vapor permeable monolithic (non-porous) films, formed from a polymeric material extruded as a thin, continuous, moisture vapor permeable, and substantially liquid impermeable film. The film layer can be extruded directly onto a first nonwoven, woven or knitted layer using conventional extrusion coating methods. Preferably, the monolithic film is no greater than 100 micrometers thick, even no greater than about 50 micrometers thick, even no greater than about 25 micrometers thick, and even no greater than about 15 micrometers thick.

Polymeric materials suitable for forming moisture vapor permeable monolithic films include block polyether copolymers such as a block polyether ester copolymers, polyetheramide copolymers, polyurethane copolymers, poly(etherimide) ester copolymers, polyvinyl alcohols, or a combination thereof. Preferred copolyether ester block copolymers are segmented elastomers having soft polyether segments and hard polyester segments, as disclosed in Hagman, U.S. Pat. No. 4,739,012 that is hereby incorporated by reference. Suitable copolyether ester block copolymers include Hytrel® copolyether ester block copolymers sold by E. I. du Pont de Nemours and Company (Wilmington, Del.), and Arnitel® polyether-ester copolymers manufactured by DSM Engineering Plastics, (Heerlen, Netherlands). Suitable copolyether amide polymers are copolyamides available under the name Pebax® from Atochem Inc. of Glen Rock, N.J., USA. Pebax® is a registered trademark of Elf Atochem, S. A. of Paris, France. Suitable polyurethanes are thermoplastic urethanes available under the name Estane® from The B. F. Goodrich Company of Cleveland, Ohio, USA. Suitable copoly(etherimide) esters are described in Hoeschele et al., U.S. Pat. No. 4,868,062. The monolithic film layer can be comprised of multiple layers moisture vapor permeable film layers. Such a film may be co-extruded with layers comprised of one or more of the above-described breathable thermoplastic film materials.

In a preferred embodiment of the present invention, the metal and organic or in-organic coating layers are deposited on a non porous, moisture vapour permeable and substantially liquid impermeable substrate using methods that do not substantially reduce the moisture vapor permeability of the substrate. The metal and organic or in-organic coating layers are deposited via a vacuum vapour deposition method, this provides a coated composite substrate that has a moisture vapor permeability that is at least about 80%, even at least about 85%, and even at least about 90% of the moisture vapor permeability of the starting substrate material.

Vacuum vapor deposition methods known in the art are preferred for depositing the metal and organic or in-organic coatings. The thickness of the metal and organic or in-organic coatings are preferably controlled within ranges that provide a composite substrate having an emissivity no greater than about 0.35.

The thickness and the composition of the outer organic or in-organic coating layer is selected such that, in addition to not substantially changing the moisture vapor permeability of the substrate layer, it does not significantly increase the emissivity of the metalized substrate.

Suitable compositions for the organic coating layer(s) include polyacrylate polymers and oligomers. The coating material can be a cross-linked compound or composition. Precursor compounds suitable for preparing the organic coating layers include vacuum compatible monomers, oligomers or low MW polymers and combinations thereof. Vacuum compatible monomers, oligomers or low MW polymers should have high enough vapor pressure to evaporate rapidly in the evaporator without undergoing thermal degradation or polymerization, and at the same time should not have a vapor pressure so high as to overwhelm the vacuum system. The ease of evaporation depends on the molecular weight and the intermolecular forces between the monomers, oligomers or polymers. Typically, vacuum compatible monomers, oligomers and low MW polymers useful in this invention can have weight average molecular weights up to approximately 1200. Vacuum compatible monomers used in this invention are preferably radiation polymerizable, either alone or with the aid of a photoinitiator, and include acrylate monomers functionalized with hydroxyl, ether, carboxylic acid, sulfonic acid, ester, amine and other functionalities. The coating material may be a hydrophobic compound or composition. The coating material may be a crosslinkable, hydrophobic and oleophobic fluorinated acrylate polymer or oligomer, according to one preferred embodiment of the invention. Vacuum compatible oligomers or low molecular weight polymers include diacrylates, triacrylates and higher molecular weight acrylates functionalized as described above, aliphatic, alicyclic or aromatic oligomers or polymers and fluorinated acrylate oligomers or polymers. Fluorinated acrylates, which exhibit very low intermolecular interactions, useful in this invention can have weight average molecular weights up to approximately 6000. Preferred acrylates have at least one double bond, and preferably at least two double bonds within the molecule, to provide high-speed polymerization. Examples of acrylates that are useful in the coating of the present invention and average molecular weights of the acrylates are described in U.S. Pat. No. 6,083,628 and WO 98/18852.

Suitable compositions for the in-organic coating layers include metal oxide components including but not limited to Silicone dioxide, titanium dioxide, tungsten dioxide, zinc oxide. Inorganic coating layer(s) can be made by the sol-gel process of depositing a partially reacted metal alkoxide onto the substrate in the presence of water and an alcohol. The layer can also be produced from the deposition of a metal chloride solution. After application layers may be reduced in thickness by dry or moist heat treatment. The most effective method for deposition of metal alkoxide or metal chloride solutions onto the substrate is by flash evaporation and deposition in a vacuum environment.

Metals suitable for forming the metal layer(s) of the composites of the present invention include aluminum, gold, silver, zinc, tin, lead, copper, and their alloys. The metal alloys can include other metals, so long as the alloy composition provides a low emissivity composite substrate. Each metal layer has a thickness between about 15 nm and 200 nm, or between about 30 nm and 60 nm, or between 1 nm and 50 nm depending on the metallization process. In one embodiment, the metal layer comprises aluminum having a thickness between about 15 and 150 nm, or between about 30 and 60 nm. Methods for forming the metal layer are known in the art and include resistive evaporation, electron beam metal vapor deposition, or sputtering. The thermal barrier properties of a material can be characterized by its emissivity. Emissivity is the ratio of the power per unit area radiated by a surface to that radiated by a black body at the same temperature. A black body therefore has an emissivity of one and a perfect reflector has an emissivity of zero. The lower the emissivity, the higher the thermal barrier properties. Each metal layer, intermediate organic coating and adjacent outer organic coating layer is preferably deposited sequentially under vacuum without exposure to air or oxygen so that there is no substantial oxidation of the metal layer. Polished aluminum has an emissivity between 0.039-0.057, silver between 0.020 and 0.032, and gold between 0.018 and 0.035. A layer of uncoated aluminum generally forms a thin aluminum oxide layer on its surface upon exposure to air and moisture. The thickness of the oxide film increases for a period of several hours with continued exposure to air, after which the oxide layer reaches a thickness that prevents or significantly hinders contact of oxygen with the metal layer, reducing further oxidation. Oxidized aluminum has an emissivity between about 0.20-0.31. By minimizing the degree of oxidation of the aluminum by depositing the outer organic coating layer prior to exposing the aluminum layer to the atmosphere, the emissivity of the composite substrate is significantly improved compared to an unprotected layer of aluminum. The outer organic coating layer also protects the metal from mechanical abrasion during roll handling, garment production and end-use.

As described in patent application US 2006/0040091 A1 (Bletsos) an apparatus suitable for vapor-deposition coating of a substrate layer with organic, in-organic and metal layers under vacuum is disclosed.

It is preferred that an organic or in-organic coating is deposited on a metal layer prior to removing the coated substrate from the vacuum chamber to prevent significant oxidation of the metal layer. It is most preferred to deposit the organic or in-organic coating layer(s) and metal layer(s) in a single pass to minimize the processing cost.

Coatings can also be applied to the fabric before or after the vacuum metallization process by a textile coating method including rotary screen printing, block screen printing, transfer printing, jet printing, spraying, sculptured roller or other appropriate method. This will apply a thicker coating than that seen with vacuum deposition and may be preferred to provide higher levels of separation between the metallised layer and other elements of the insulation system, body or outside environment. This coating can be preceded by vacuum or atmospheric plasma treatment of the substrate to increase adhesion of the coating to the substrate.

In one embodiment, said metal may be produced by means of coating the substrate a thin metallic film by means of sputtering, rotary screen printing, block screen printing, transfer printing, jet printing, spraying, sculptured roller or other methods and adhering said metal film onto the said substrate. In alternative embodiment, said thin metallic film is applied onto a release paper or other material and then adhered onto said substrate.

The metalized composites of the present invention are especially suitable for use in marine apparel, wet weather apparel or outdoor equipment such as tents or sleeping bags. The highly reflective metalized surface of the composite substrate provides a low emissivity surface that enhances the performance of the apparel and reduces heat loss from the body by reflecting body heat back in the system. Additional benefits include shielding the body from excessive heat during the summer months.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Although the present invention has been described with particular reference to certain preferred embodiments thereof, variations and modifications of the present invention can be effected within the spirit and scope of the following claims.

What is claimed is:

1. An infra-red reflective composite comprising:
   an outer layer comprising a foam material;
   an inner layer comprising a fleece material;
   a closed cell neoprene foam layer sandwiched between the outer layer and the inner layer, and
   at least one metal layer facing the closed cell foam layer, comprising a material selected from the group consisting of Al, Cu, Au, Zn, Mg, Ti, Ag, AL2O3, stainless steel, AgGe, CuZn, CuSn, CuAg, or CuAgSn;
   wherein the closed cell foam layer comprises a pattern of perforations through the closed cell foam layer, which create gaps that expose at least a portion of the metal layer; and
   wherein said perforations expose over 30% of a surface area of the metal layer.

2. The composite of claim 1, wherein the closed cell foam layer is bonded to at least one of the layers.

3. The composite according to claim 1, wherein the outer layer is substantially liquid impermeable.

4. The composite according to claim 1, further comprising an additional layer between the closed cell foam layer and the inner layer.

5. The composite according to claim 1, wherein said outer layer comprises a closed cell foam.

6. The composite according to claim 4, wherein the additional layer comprises a membrane selected from the group consisting of a knitted textile, a woven textile, and a non-woven textile.

7. The composite according to claim 6, wherein the membrane comprises a material selected from the group consisting of Nylon, polyester, spandex, polypropylene, cotton, and wool.

8. The composite according to claim 1, wherein the closed cell foam layer comprises a material that has substantially less thermal conductivity than the metal layer.

9. The composite according to claim 1, wherein said pattern comprises an array of shapes selected from the group consisting of circles, squares, diamonds, polygons, hexagons, or honeycombs.

10. The composite according to claim 1, wherein said closed cell layer has a thickness between 0.5 mm and 10 mm.

11. The composite of claim 1, further comprising a functional layer applied to at least one of the other layers.

12. The composite according to claim 11, wherein said functional layer comprises an acrylic polymer.

13. The composite according to claim 11, wherein said functional layer comprises a transition metal oxide.

14. The composite according to claim 11, wherein said functional layer applied to the surface of the metal layer comprises a transition metal oxide selected from the group consisting of titanium dioxide, tungsten dioxide and zinc oxide.

15. The composite according to claim 11, wherein a functional component is added to said functional layer to provide at least one functional property.

16. The composite according to claim 15, wherein said functional component comprises a functional group selected from the group consisting of hydroxyl, carboxyl, sulfonic, amino, amido, and ether to provide a hydrophilic functionality.

17. The composite according to, claim 15, wherein said functional component comprises a fluorinated monomer to provide a water and oil repellency functionality.

18. The composite according to claim 11, wherein said functional layer comprises a sol-gel that provides a hydrophobic microstructure.

19. The composite according claim 11, wherein said functional layer comprises a biocide.

20. The composite according to claim 11, wherein said functional layer contains a fluorinated group to provide a super-hydrophobic functionality.

21. The composite according to claim 11, wherein said functional layer comprises a sol-gel with photocatalytic activity to provide an oxidative break down, in the presence of UV light, of organic materials that contaminate the surface of the substrate in a self cleaning action.

22. The composite according to claim 11, wherein said functional layer comprises a colour additive.

23. The composite according to claim 11, wherein said functional layer comprises a brominated monomer to provide a fire retardant functionality.

24. The composite according to claim 4, wherein said additional layer comprises a membrane formed of a polyether selected from the group consisting of polyether ester, polyether amide, and polyether urethane.

25. The composite according to claim 1, wherein said metal layer comprises a metallic film adhered to a surface of the outer layer.

26. The composite according to claim 1, wherein the metal layer has a predetermined emissivity.

27. The composite according to claim 1 wherein the metal layer is comprised of a material having a predetermined emissivity.

28. The composite according to claim 1, further comprising a silver precipitate to provide antibacterial properties.

29. The composite according to claim 1, wherein the metal layer has a thickness of between approximately 10 nm and approximately 200 nm.

30. An article of clothing comprising an infra-red reflective composite according to claim 1.

31. The composite according to claim 25, wherein said metal layer was coated onto a release paper by a process selected from the group consisting of sputtering, rotary screen printing, block screen printing, transfer printing, jet printing, spraying, and sculptured roller prior to being adhered to the surface of the outer layer.

32. The composite according to claim 4, wherein said metal layer comprises a metallic film adhered to a surface of the additional layer.

33. The composite according to claim 1, wherein said perforations expose at least about 40% of a surface area of the metal layer.

34. The composite according to claim 1, wherein said perforations expose at least about 51% of a surface area of the metal layer.

35. An infra-red reflective composite comprising:
an outer layer comprising a fabric material;
a membrane layer adjacent to an inside surface of the outer layer;
a metal layer adhered to an inside surface of the membrane layer, comprising a material selected from the proud consisting of Al, Cu, Au, Zn, Mg, Ti, Ag, AL2O3, stainless steel, AgGe, CuZn, CuSn, CuAg, or CuAgSn;
an inner layer comprising a fleece material; and
a closed cell neoprene foam layer sandwiched between the metal layer and the inner layer, and
wherein the closed cell foam layer comprises a pattern of perforations through said closed cell foam layer, which create gaps that expose at least a portion of the metal layer;
wherein said membrane layer is substantially water vapor permeable; and
wherein said perforations expose over 30% of a surface area of the metal layer.

36. The composite of claim 35, wherein at least one of the outer layer and the membrane layer is substantially liquid impermeable.

37. The composite of claim 35, further comprising an inner membrane layer between the closed cell foam layer and the inner layer formed of a material selected from the group of a knitted textile, a woven textile, a non-woven textile, Nylon, polyester, spandex, polypropylene, cotton, wool, polyether ester, polyether amide, and polyether urethane.

38. The composite according to claim 35, wherein said perforations expose at least about 40% of a surface area of the metal layer.

39. The composite according to claim 35, wherein said perforations expose at least about 51% of a surface area of the metal layer.

40. The composite according to claim 35, wherein said metal layer was coated onto a release paper by a process selected from the group consisting of sputtering, rotary screen printing, block screen printing, transfer printing, jet printing, spraying, and sculptured roller prior to being adhered to the surface of the outer layer.

41. The composite according to claim 35, further comprising a functional layer applied to at least one of the layers of claim 35.

42. The composite according to claim 41, wherein said functional layer comprises a component selected from the group consisting of an acrylic polymer, a transition metal oxide, hydroxyl, carboxyl, sulfonic, amino, amido, ether, a fluorinated monomer, a sol-gel, a biocide, a fluorinated group, and a brominated monomer.

* * * * *